US007975679B2

(12) United States Patent
Tanaka

(10) Patent No.: US 7,975,679 B2
(45) Date of Patent: Jul. 12, 2011

(54) OTHER-TYPE FUEL CONTAMINATION DETERMINATION APPARATUS FOR INTERNAL COMBUSTION ENGINE

(75) Inventor: Toshihiko Tanaka, Kariya (JP)

(73) Assignee: Denso Corporation, Kariya (JP)

( * ) Notice: Subject to any disclaimer, the term of this patent is extended or adjusted under 35 U.S.C. 154(b) by 65 days.

(21) Appl. No.: 12/135,287

(22) Filed: Jun. 9, 2008

(65) Prior Publication Data

US 2009/0031704 A1 Feb. 5, 2009

(30) Foreign Application Priority Data

Jul. 31, 2007 (JP) ................................ 2007-198322

(51) Int. Cl.
*F02D 41/00* (2006.01)
(52) U.S. Cl. .......... 123/672; 123/304; 123/690; 60/276; 60/285
(58) Field of Classification Search .................. 123/698, 123/304, 672, 525, 526, 690; 60/276, 285; 701/109, 114; 702/185; 73/114.54
See application file for complete search history.

(56) References Cited

U.S. PATENT DOCUMENTS

| 4,109,633 | A |   | 8/1978  | Mitsudo et al. |           |
|-----------|---|---|---------|----------------|-----------|
| 4,967,714 | A | * | 11/1990 | Inoue          | 123/694   |
| 5,020,499 | A | * | 6/1991  | Kojima et al.  | 123/479   |
| 5,158,058 | A | * | 10/1992 | Yoshida et al. | 123/434   |
| 5,195,497 | A | * | 3/1993  | Yoshida et al. | 123/696   |
| 5,469,831 | A |   | 11/1995 | Takahashi      |           |
| 6,016,796 | A | * | 1/2000  | Dalton         | 123/695   |
| 6,073,611 | A | * | 6/2000  | Ohuchi et al.  | 123/435   |
| 6,318,152 | B1| * | 11/2001 | Hagihara et al.| 73/35.02  |
| 6,932,069 | B2| * | 8/2005  | Suyama et al.  | 123/674   |
| 6,975,933 | B2| * | 12/2005 | Abe et al.     | 701/109   |
| 2005/0039733 | A1 | * | 2/2005 | DeWitte et al. | 123/672  |

FOREIGN PATENT DOCUMENTS

| JP | A-2-125967 | 5/1990 |
| JP | 6-15835    | 3/1994 |
| JP | A-7-139379 | 5/1995 |

OTHER PUBLICATIONS

Office Action dated Jan. 13, 2011 (1 pg.) issued in corresponding Japanese Application No. 2007-198322 with an at least partial English-language translation thereof (1 pg.).

* cited by examiner

*Primary Examiner* — Stephen K Cronin
*Assistant Examiner* — Raza Najmuddin
(74) *Attorney, Agent, or Firm* — Nixon & Vanderhye P.C.

(57) ABSTRACT

A other-type fuel contamination determination apparatus for an internal combustion engine includes an exhaust gas sensor. The exhaust gas sensor is configured for obtaining one of (a) an air-fuel ratio and (b) a combustion state for the internal combustion engine based on exhaust gas. The other-type fuel contamination determination apparatus determines whether other-type fuel contaminates fuel that is supplied to the internal combustion engine based on an output by the exhaust gas sensor.

10 Claims, 4 Drawing Sheets

OTHER-TYPE FUEL CONTAMINATION DETERMINATION APPARATUS FOR INTERNAL COMBUSTION ENGINE

CROSS REFERENCE TO RELATED APPLICATION

This application is based on and incorporates herein by reference Japanese Patent Application No. 2007-198322 filed on Jul. 31, 2007.

BACKGROUND OF THE INVENTION

1. Field of the Invention

The present invention relates to an other-type fuel contamination determination apparatus for an internal combustion engine, which apparatus has a function of determining whether other-type fuel contaminates fuel that is supplied to the internal combustion engine.

2. Description of Related Art

A characteristic of fuel used for an internal combustion engine depends on an area or a season. For example, fuel having a large specific gravity or fuel having a small amount of low-boiling components is less likely to be volatile at a low temperature. JP-B-H06-15835 (for example, P.2) describes a system that executes an air-fuel ratio feed-back control for determining a final fuel supply amount by computing a feed-back correction amount of the fuel. The above feed-back correction amount of the fuel is computed so as to cause an air-fuel ratio of the exhaust gas detected by air-fuel ratio detection means to correspond to a target air-fuel ratio. In the above system, an average value of the final fuel supply amounts during the air-fuel ratio feed-back control is considered to be a specific gravity of fuel, and a fuel injection quantity during a cold operation, that is an open-loop control, for the internal combustion engine is corrected according to the specific gravity.

The internal combustion engine includes a gasoline engine that uses gasoline or a diesel engine that uses light oil. Recently, there have been constructed more self-service gas stations, where a driver refuels a vehicle by himself or herself. Therefore, the driver may supply light oil to a vehicle having the gasoline engine by mistake. In the above case, the light oil is other-type fuel that is not usable for the gasoline engine. Also, bad fuel, which is intentionally made by mixing other-type fuel into gasoline, may be supplied to the vehicle. In the above, the other-type fuel may be light oil or kerosene. In general, a specific gravity of gasoline, that is a fuel characteristic, may depend on the area or the season. Thus, a technique described in JP-B-H6-15835 (P.2) enables the vehicle to normally drive even when gasoline having the various specific gravities (fuel characteristic) is supplied to the vehicle having the gasoline engine.

In general, in a case, where other-type fuel (e.g., light oil, kerosene) or bad fuel is supplied to the vehicle having the gasoline engine, residual gasoline exists by some extent in a fuel tank. As a result, a recent electronic engine control system is able to operate the engine by an ignition timing control provided that contamination ratio of the other-type fuel relative to gasoline in the fuel tank is small. However, when the contamination ratio of the other-type fuel becomes larger, a combustion state of the engine deteriorates, and thereby, the engine rotation becomes unstable. Thus, in addition to the deterioration of the drivability, the engine may stop to disable the vehicle to run in a worst case scenario.

Even when other-type fuel or bad fuel is supplied in a state, where gasoline slightly exists in the fuel tank, gasoline in a fuel pipe from the fuel tank to the engine is supplied to the engine at an earlier stage. Thus, the engine may be normally operated for a while. Then, when it comes to a stage, were gasoline does not exist in the fuel pipe, and thereby other-type fuel or bad fuel is injected, the combustion state of the engine deteriorates causing the instability of the engine rotation. As a result, in a worst case scenario, the engine may stop to disable the vehicle to run disadvantageously.

SUMMARY OF THE INVENTION

The present invention is made in view of the above disadvantages. Thus, it is an objective of the present invention to address at least one of the above disadvantages.

To achieve the objective of the present invention, there is provided a other-type fuel contamination determination apparatus for an internal combustion engine, which apparatus includes an exhaust gas sensor and other-type fuel contamination determining means. The exhaust gas sensor is configured for obtaining one of (a) an air-fuel ratio and (b) a combustion state for the internal combustion engine based on exhaust gas. The other-type fuel contamination determining means determines whether other-type fuel contaminates fuel that is supplied to the internal combustion engine based on an output by the exhaust gas sensor.

To achieve the objective of the present invention, there is also provided a other-type fuel contamination determination apparatus for an internal combustion engine, which apparatus includes an exhaust gas sensor and other-type fuel contamination determining means. The exhaust gas sensor is configured to detect a component of exhaust gas for obtaining an operational state of the internal combustion engine. The other-type fuel contamination determining means determines whether other-type fuel contaminates fuel that is supplied to the internal combustion engine based on the operational state of the internal combustion engine.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF PREFERRED EMBODIMENTS

One embodiment is made by applying a best mode for performing the present invention to a gasoline engine and is described with reference to accompanying drawings. The gasoline engine indicates an engine that uses gasoline as fuel.

Figure 1:
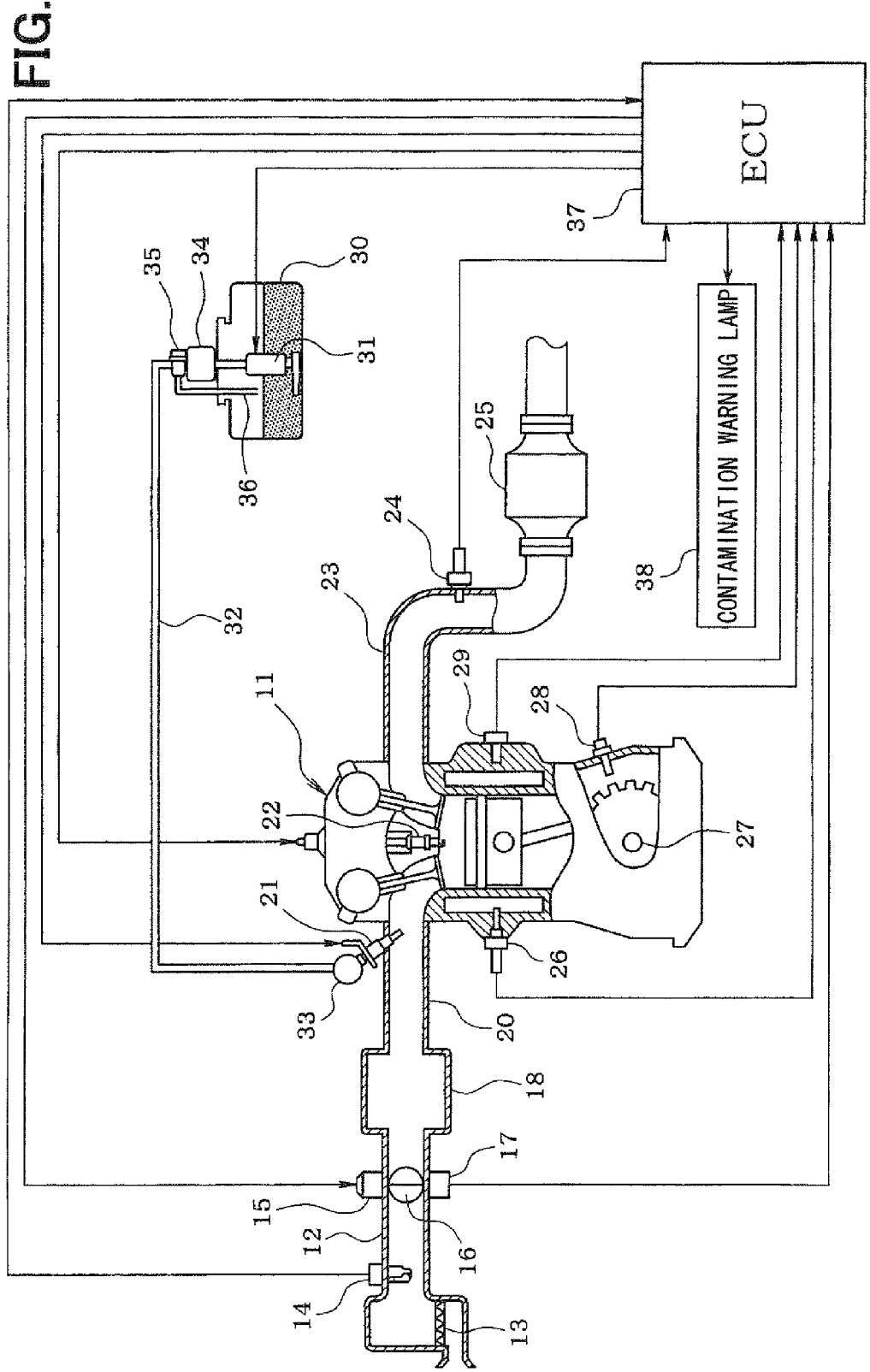
FIG. 1 is a schematic general configuration of an engine control system according to one embodiment of the present invention.

Referring to FIG. 1, a general configuration of an engine control system is described.

An engine 11 is an internal combustion engine and is connected with an intake pipe 12. An air cleaner 13 is provided most upstream of the intake pipe 12, and an air flow meter 14 is provided to the intake pipe 12 downstream of the air cleaner 13 for detecting an intake air amount. A throttle valve 16, an opening of which is adjusted by a motor 15, is provided to the intake pipe 12 downstream of the air flow meter 14. Also, a throttle opening sensor 17 is provided to the intake pipe 12 downstream of the air flow meter 14 for detecting a throttle opening of the throttle valve 16.

Further, a surge tank 18 is provided to the intake pipe 12 downstream of the throttle valve 16, and the surge tank 18 is connected an intake manifold 20 that introduces air to each cylinder of the engine 11. A fuel injection valve 21 is provided adjacently to an intake port of each cylinder of the intake manifold 20 for injecting fuel. Also, an ignition plug 22 is assembled to a cylinder head of the engine 11 for each cylinder, and air-fuel mixture in the cylinder is ignited through spark discharge of each ignition plug 22.

In contrast, an exhaust pipe 23 of the engine 11 is provided with an exhaust gas sensor 24 (for example, air-fuel ratio sensor, oxygen sensor) for obtaining an air-fuel ratio or a combustion state based on exhaust gas. For example, the exhaust gas sensor detects a component, such as oxygen, in exhaust gas such that the operational state of the engine 11 is obtained. In the above, the operational state may be an air-fuel ratio of air-fuel mixture supplied to the engine 11, which ratio is obtainable or estimated based on the detected oxygen in exhaust gas. Also, the operational state may be the combustion state, such as a lean combustion, rich combustion, of the engine 11. Also, a catalytic converter 25, such as a three-way catalytic converter, is provided to the exhaust pipe 23 downstream of the exhaust gas sensor 24 such that the catalytic converter 25 purifies exhaust gas.

Also, the engine 11 has a cylinder block that is provided with a coolant temperature sensor 26 and a knock sensor 29. The coolant temperature sensor 26 senses temperature of a coolant, and the knock sensor 29 senses engine knocking. Also, there is provided a crank angle sensor 28 at an outer periphery of a crank shaft 27 such that the crank angle sensor 28 outputs a pulse signal when the crank shaft 27 rotates by a predetermined crank angle. A crank angle and an engine rotation speed are detected based on the output signal by the crank angle sensor 28.

A fuel pump 31 that pumps up fuel is provided inside a fuel tank 30 that stores fuel, that is gasoline. The fuel pumped by the fuel pump 31 is transmitted to a delivery pipe 33 through a fuel pipe 32, and the fuel is distributed to the fuel injection valve 21 of each cylinder through the delivery pipe 33. The fuel pipe 32 is connected with a filter 34 and with a pressure regulator 35 around the fuel pump 31, and the pressure regulator 35 controls discharge pressure of the fuel pump 31 at a predetermined pressure. Excessive fuel that exceeds the predetermined pressure is returned to the fuel tank 30 through a fuel return pipe 36.

The outputs from the above various sensors are inputted into a control circuit (ECU) 37. The ECU 37 is configured to mainly include a microcomputer and executes various engine control programs stored in a ROM (storage medium) such that the ECU 37 controls a fuel injection quantity of each of the fuel injection valves 21 and ignition timing of each of the ignition plugs 22 in accordance with an engine operational state.

In the above case, when a predetermined air-fuel ratio F/B control execution condition is established, the ECU 37 executes an air-fuel ratio F/B control for correcting the fuel injection quantity of the fuel injection valve 21. Specifically, in the air-fuel ratio F/B control, the ECU 37 computes an air-fuel ratio F/B correction amount based on the output by the exhaust gas sensor 24 to cause the air-fuel ratio estimated based on the exhaust gas to correspond to a target air-fuel ratio and then uses the above air-fuel ratio FIB correction amount to correct the fuel injection quantity of the fuel injection valve 21. Note that "F/B" indicates "feed back".

Even in a case, where other-type fuel (e.g., light oil, kerosene) or bad fuel mixed with other-type fuel is supplied to the vehicle having the gasoline engine 11, some gasoline may still remain in the fuel tank 30 at the time of the supply. As a result, the electronic engine control system of the present embodiment is able to operate the engine 11 by a ignition timing control provided that the contamination ratio of other-type fuel relative to the gasoline in the fuel tank 30 is substantially small. However, as the contamination ratio of other-type fuel becomes larger, the combustion state of the engine 11 deteriorates, and thereby the engine rotation becomes unstable. Thus, in addition to deterioration of the drivability, the engine 11 may stop to disable the vehicle to run in a worst case scenario.

Thus, the ECU 37 executes a below described other-type fuel contamination determination routine shown in FIG. 3 such that the ECU 37 determines whether other-type fuel contaminates the fuel supplied to the engine 11 based on the output by the exhaust gas sensor 24. In the above, the other-type fuel includes at least one of light oil, kerosene, and heavy oil and is not suitable for the fuel used for the engine 11.

When the other-type fuel, such as light oil, kerosene, heavy oil, contaminates gasoline supplied to the engine 11, the air-fuel ratio of air fuel mixture (the air-fuel ratio for the engine 11) is widely changed toward a leaner operation (leaner combustion). Accordingly, the output by the exhaust gas sensor 24 is widely changed toward the leaner operation. As a result, the output by the exhaust gas sensor 24 falls beyond a normal range, within which the output by the exhaust gas sensor 24 falls while normal fuel is supplied. Thus, the air-fuel ratio F/B correction amount for the air-fuel ratio F/B control is made larger toward a richer operation (richer combustion). Thus, the air-fuel ratio F/B correction amount also falls beyond a normal range, within which the air-fuel ratio F/B correction amount falls while normal fuel is supplied.

Figure 2:
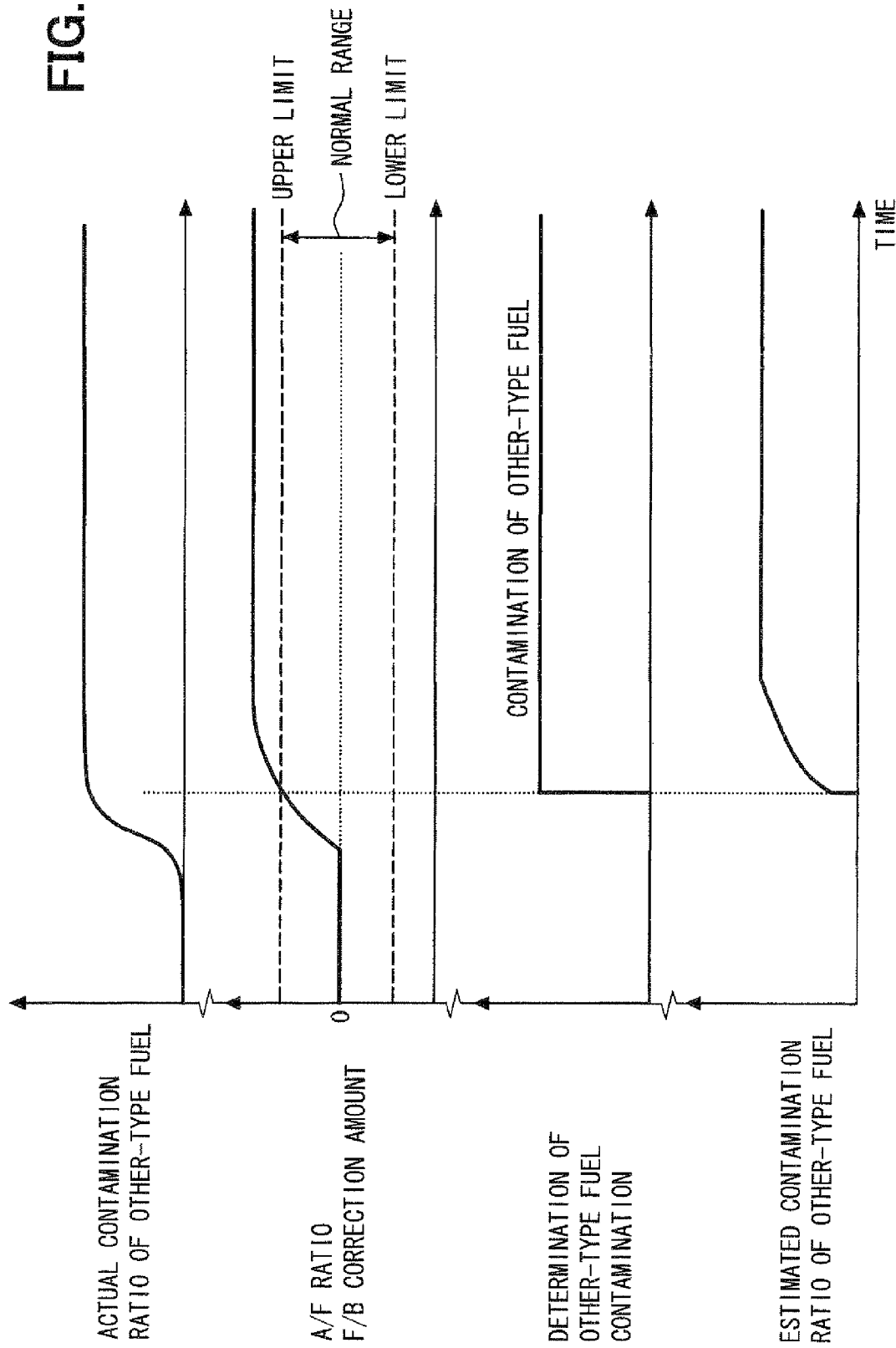
FIG. 2 is a timing chart for explaining a determination method for determining other-type fuel contamination.

The present embodiment is made in view of the above characteristic, and, as shown in a timing chart in FIG. 2, it is determined whether the air-fuel ratio F/B correction amount falls beyond a predetermined normal range during the air-fuel ratio F/B control. When the air-fuel ratio F/B correction amount falls beyond the normal range, it is determined that other-type fuel, such as light oil, kerosene, heavy oil, contaminates the gasoline. Thus, it is accurately determined whether other-type fuel contaminates by observing the air-fuel ratio F/B correction amount as above, and thereby the contamination of the other-type fuel is rapidly detected when other-type fuel contaminates.

Further, there is considered the characteristic of change of the air-fuel ratio F/B correction amount related to the change of the air-fuel ratio estimated based on exhaust gas (the output by the exhaust gas sensor 24). In the above, the air-fuel ratio changes in accordance with the contamination ratio of the other-type fuel. Under the above consideration, when it is determined that other-type fuel contaminates the fuel supplied to the engine 11, the contamination ratio of other-type fuel is estimated based on the air-fuel ratio F/B correction amount by using a map (see FIG. 4) or an equation for estimating the contamination ratio of other-type fuel.

Figure 3:
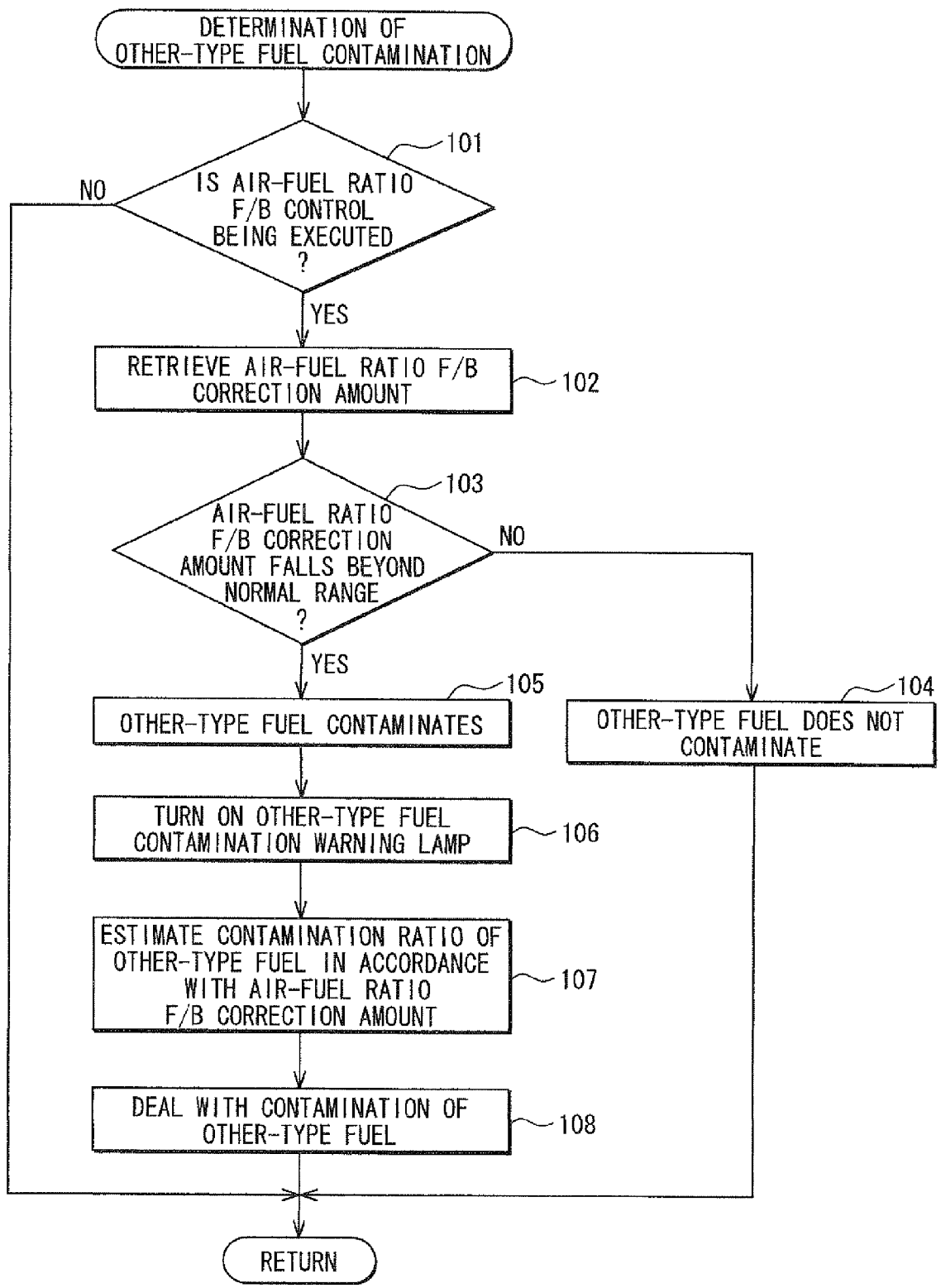
FIG. 3 is a flow chart for explaining a procedure of other-type fuel contamination determination routine.

As above, other-type fuel contamination determination of the present embodiment is executed by the ECU 37 based on the other-type fuel contamination determination routine shown in FIG. 3. The process of above determination routine is described below.

The other-type fuel contamination determination routine shown in FIG. 3 is executed by predetermined intervals when a power source of the ECU 37 is on, and the determination routine serves as other-type fuel contamination determining means. When the present routine is started, firstly, at step 101, it is determined whether the air-fuel ratio F/B control is being executed. When the air-fuel ratio F/B control is not being executed, the present routine is ended without executing processing of the other-type fuel contamination determination at step 102 and later steps.

In contrast, when it is determined at step 101 that the air-fuel ratio FIB control is being executed, processing of the other-type fuel contamination determination at step 102 and later steps is executed as below. Firstly, control proceeds to step 102, and an air-fuel ratio FIB correction amount by the air-fuel ratio F/B control is retrieved.

Then, control proceeds to step 103, and it is determined whether the air-fuel ratio F/D correction amount falls beyond the normal range. In other words, it is determined whether the air-fuel ratio F/B correction amount is larger than an upper limit determination value and whether the F/B correction amount is smaller than a lower limit determination value. Note that, the upper limit determination value may be, for example, an upper limit value (positive value) of the air-fuel ratio FIB correction amount for a normal case, where normal fuel (gasoline) is supplied. Also, the lower limit determination value may be, for example, a lower limit value (negative value) of the air-fuel ratio FIB correction amount for the normal case.

In the above case, the determination values (an upper limit determination value and a lower limit determination value) are changed in accordance with engine temperature or temperature information associated with the engine temperature. The temperature information may be coolant temperature or oil temperature, for example. A vaporization property and a wet amount (moisture on the wall surface) of fuel changes in accordance with engine temperature, and thereby the air-fuel ratio estimated based on the exhaust gas or the output by the exhaust gas sensor 24 changes. Thus, the determination values are change appropriately to correspond to the above change.

When it is determined at step 103 that the air-fuel ratio F/B correction amount falls within the normal range, control proceeds to step 104, where it is determined that the other-type fuel, such as light oil, kerosene, heavy oil, does not contaminate. Then, the present determination routine is ended. In the above, when the air-fuel ratio F/B correction amount falls within the normal range, the air-fuel ratio FIB correction amount falls within a range from the upper limit determination value to the lower limit determination value, for example.

In contrast, when it is determined at step 103 that the air-fuel ratio F/B correction amount falls beyond the normal range, control proceeds to step 105, where it is determined that other-type fuel (e.g., light oil, kerosene, heavy oil) contaminates the fuel supplied to the engine 11. Then, control proceeds to step 106, where a other-type fuel contamination warning lamp 38 is turned on or a warning display member (not shown) is caused to display "other-type fuel contamination" to warn the driver. In the above, the other-type fuel contamination warning lamp 38 and the warning display member are mounted on an instrument panel of a driver seat, for example. Due to the above, it is possible to notify the driver of the contamination of other-type fuel at an earlier stage. In the above, when the air-fuel ratio F/B correction amount falls beyond the normal range, the air-fuel ratio F/B correction amount is either larger than the upper limit determination value or smaller than the lower limit determination value.

Figure 4:
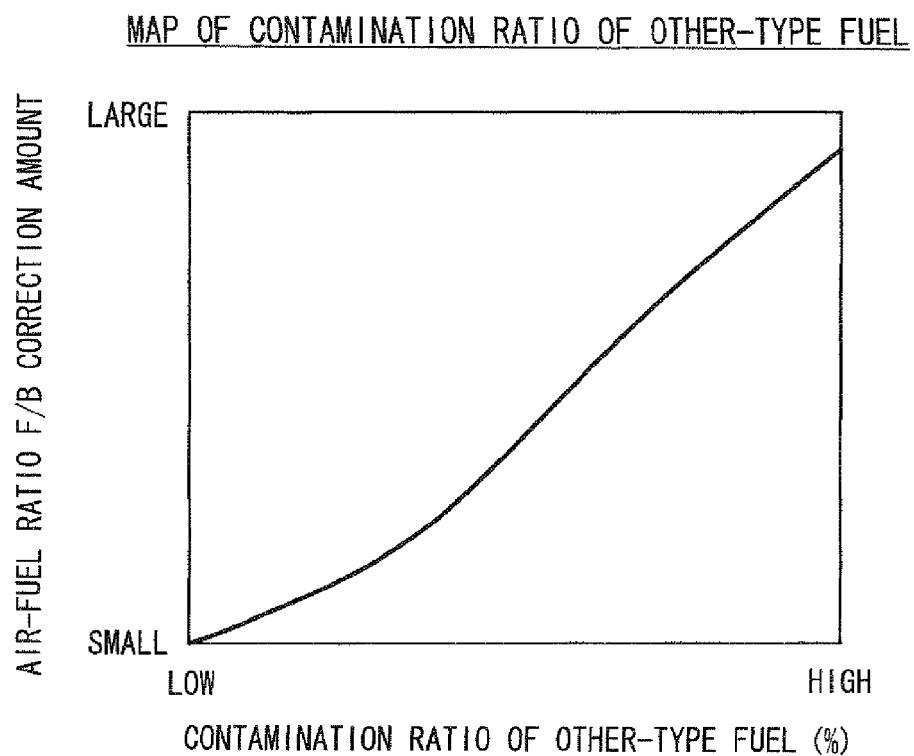
FIG. 4 is a diagram illustrating a concept of one example of a map for an other-type fuel contamination ratio.

Then, control proceeds to step 107, the contamination ratio of the other-type fuel is computed in accordance with a present air-fuel ratio F/B correction amount by referring to the map of the contamination ratio of the other-type fuel in FIG. 4. As the contamination ratio of other-type fuel indicates higher value, the air-fuel ratio estimated based on the exhaust gas (the output by the exhaust gas sensor 24) is likely to change more widely, and thereby an absolute value of the air-fuel ratio F/B correction amount becomes larger. Thus, the map of the contamination ratio of other-type fuel in FIG. 4 is made such that the contamination ratio of other-type fuel is determined as a higher value as the absolute value of the air-fuel ratio F/B correction amount is greater. Process at step 107 corresponds to other-type fuel contamination ratio estimation means.

Then, control proceeds to step 108, where an operation control of the engine 11 (for example, at least one of a fuel injection control, a throttle control, a torque control, an air-fuel ratio control, an idle rotation speed control) is switched to a certain control for a abnormal case for the other-type fuel contamination such that the vehicle is enabled to travel safely as long as possible. In the above, the certain control for the abnormal case is changed in accordance with the contamination ratio of other-type fuel such that an appropriate control for the contamination ratio of other-type fuel is performed.

In the present embodiment, when light oil, kerosene, or heavy oil contaminates the gasoline that is supplied to the engine 11, the air-fuel ratio estimated based on the exhaust gas (the output by the exhaust gas sensor 24) is widely changed toward the leaner operation, and thereby the air-fuel ratio F/B correction amount is made to become larger to change toward the richer operation. As a result, the air-fuel ratio F/B correction amount may fall beyond the normal range. In view of the above characteristic, in the present embodiment, it is determined whether the air-fuel ratio F/B correction amount falls beyond the normal range. When the air-fuel ratio F/B correction amount is determined to fall beyond the normal range, it is determined that other-type fuel, such as light oil, kerosene, heavy oil, contaminates the gasoline. Thus, the other-type fuel contamination is enabled to be accurately detected, and when the other-type fuel contaminates the fuel to be supplied to the engine 11, the contamination of the other-type fuel is enabled to be quickly detected. As a result, when the other-type fuel contaminates, the other-type fuel contamination warning lamp 38 is enabled to notify the driver of the other-type fuel contamination, and thereby it is possible to urge the driver to rapidly deal with the contaminated fuel, such as by replacing the fuel. Also, when the other-type fuel contaminates, the control of the engine 11 is changed into the certain control dedicated for the other-type fuel contamination such that the vehicle is enabled to safely drive as long as possible.

Furthermore, in the present embodiment, the air-fuel ratio estimated based on the exhaust gas (the output by the exhaust gas sensor 24) changes in accordance with the contamination ratio of other-type fuel, and thereby the air-fuel ratio F/B correction amount changes. In view of the characteristic of the above change, when it is determined that other-type fuel contaminates the fuel supplied to the engine 11, it is configured that the contamination ratio of other-type fuel is estimated based on the air-fuel ratio F/B correction amount. As a result, the contamination ratio of other-type fuel is enabled to be accurately estimated. Due to the above, when the control of the engine 11 is changed into the certain control dedicated for the other-type fuel contamination, the appropriate control is enabled to be performed based in the contamination ratio of other-type fuel.

However, the present invention may be applied to another embodiment, in which a contamination ratio of other-type fuel is not estimated even when it is determined that other-type fuel contaminates the fuel supplied to the engine 11.

Also, in the present embodiment, the determination values (the upper limit determination value and the lower limit determination value) for determining the other-type fuel contamination are changed in accordance with the engine temperature or the temperature information associated with the engine temperature (for example, coolant temperature or oil temperature). As a result, the determination value is appropriately set relative to the change of the air-fuel ratio estimated based on the exhaust gas (the output by the exhaust gas sensor 24), which change is caused by the change of the vaporization property of the fuel or the wet amount (fuel moisture on the wall surface) due to the engine temperature. Therefore, the determination accuracy for determining the other-type fuel contamination is improved.

Note that, in the above embodiment, the determination values for determining the other-type fuel contamination are changed in accordance with the engine temperature or the temperature information associated with the engine temperature. However, a determination parameter (air-fuel ratio F/B correction amount) may be changed in accordance with the engine temperature or the temperature information associated with the engine temperature.

Also, in the above embodiment, the other-type fuel contamination is detected depending on whether the air-fuel ratio F/B correction amount falls beyond the normal range. However, a determination method for determining the other-type fuel contamination may be changed as required. For example, the other-type fuel contamination may be detected depending on whether the output by the exhaust gas sensor 24 falls beyond the normal range. Alternatively, a change amount of the output by the exhaust gas sensor 24 or a change amount of the air-fuel ratio F/B correction amount may be compared with a corresponding determination value to determine whether the other-type fuel contaminates the fuel supplied to the engine 11.

Also, in the above embodiment, it is determined whether light oil, kerosene, or heavy oil contaminates the gasoline supplied to the engine 11 for the determination of the other-type fuel contamination. However, it may alternatively be determined whether alcohol contaminates the gasoline by an amount equal to or greater than a permissible level.

Also, the present invention is not limited to the intake port injection engine shown in FIG. 1. However, the preset invention may be applied to a cylinder injection engine or to a dual injection engine having a fuel injection valve for the intake port injection and a fuel injection valve for the cylinder injection.

Further, the present invention may be applied to a diesel engine that uses light oil as fuel, and it may be determined whether gasoline contaminates light oil that is supplied to the engine based on the output by the exhaust gas sensor 24. In the above, the gasoline is other-type fuel that is not usable for the diesel engine.

Also, the present invention may be applied to a bi-fuel engine that is able to use any fuel of gasoline, alcohol, and alcohol-mixed fuel having alcohol mixed into gasoline. In the above configuration, the light oil, kerosene, and heavy oil are not usable, and thereby it may be determined whether light oil, kerosene, or heavy oil contaminates the fuel supplied to the engine based on the output by the exhaust gas sensor 24.

Additional advantages and modifications will readily occur to those skilled in the art. The invention in its broader terms is therefore not limited to the specific details, representative apparatus, and illustrative examples shown and described.

What is claimed is:

1. An other-type fuel contamination determination apparatus for an internal combustion engine of a vehicle comprising:

an exhaust gas sensor for obtaining one of (a) an air-fuel ratio and (b) a combustion state for the internal combustion engine based on exhaust gas; and other-type fuel contamination determining means for determining whether other-type fuel, which is a different kind from a predetermined fuel used for the internal combustion engine and is unsuitable for the internal combustion engine, is mixed into fuel that is supplied to the internal combustion engine based on whether an output by the exhaust gas sensor goes out of a normal range.

2. The other-type fuel contamination determination apparatus according to claim 1, further comprising:

air-fuel ratio feed back control means for feedback correcting a fuel injection quantity by an air-fuel ratio feed-back correction amount based on the output by the exhaust gas sensor such that the air-fuel ratio obtained based on exhaust gas corresponds to a target air-fuel ratio, wherein:

the other-type fuel contamination determining means determines whether the other-type fuel is mixed into the fuel based on the air-fuel ratio feed-back correction amount for the air-fuel ratio feed back control means.

3. The other-type fuel contamination determination apparatus according to claim 2, further comprising:

other-type fuel contamination ratio estimation means for estimating a contamination ratio of the other-type fuel based on the air-fuel ratio feed-back correction amount when the other-type fuel contamination determining means determines that the other-type fuel is mixed into the fuel.

4. The other-type fuel contamination determination apparatus according to claim 1, wherein:

the other-type fuel contamination determining means changes a determination condition based on temperature of the internal combustion engine, the determination condition being used when the other-type fuel contamination determining means determines whether the other-type fuel mixed into the fuel.

5. A method of determining an other-type fuel contamination of an internal combustion engine of a vehicle, the method comprising:

obtaining one of (a) an air-fuel ratio and (b) a combustion state for the internal combustion engine based on exhaust gas from an exhaust gas sensor; and determining whether other-type fuel, which is a different kind from a predetermined fuel used for the internal combustion engine and is unsuitable for the internal combustion engine, is mixed into fuel that is supplied to the internal combustion engine based on whether an output by the exhaust gas sensor goes out of a normal range wherein:

the internal combustion engine is a gasoline engine that uses gasoline as the predetermined fuel; and the other-type fuel is at least one of light oil, kerosene, or heavy oil, which is a different kind of fuel from the predetermined fuel used for the internal combustion engine.

6. The method according to claim 5, further comprising:
feedback correcting a fuel injection quantity by an air-fuel ratio feed-back correction amount based on the output by the exhaust gas sensor such that the air-fuel ratio obtained based on exhaust gas corresponds to a target air-fuel ratio, wherein:
whether the other-type fuel is mixed into the fuel is determined based on the air-fuel ratio feed-back correction amount.

7. The method according to claim 6, further comprising:
estimating a contamination ratio of the other-type fuel based on the air-fuel ratio feed-back correction amount when it is determined that the other-type fuel is mixed into the fuel.

8. The method according to claim 5, further comprising changing a determination condition based on temperature of the internal combustion engine, the determination condition being used when it is determined whether the other-type fuel is mixed into the fuel.

9. The other-type fuel contamination determination apparatus according to claim 1, further comprising:
a warning device that warns a driver of the vehicle of the mixing of the other-type fuel when the other-type fuel contamination determining means determines that the other-type fuel is mixed into the fuel.

10. The method according to claim 5, further comprising:
warning a driver of the vehicle of the mixing of the other-type fuel when it is determined that the other-type fuel is mixed into the fuel.

* * * * *